United States Patent

[11] 3,577,131

[72] Inventors Robert H. Morrow
Lebanon Township, Hunterdon County;
Anthony J. Perneski, Martinsville, N.J.
[21] Appl. No. 795,148
[22] Filed Jan. 30, 1969
[45] Patented May 4, 1971
[73] Assignee Bell Telephone Laboratories, Incorporated
Murray Hill, N.J.

[54] DOMAIN PROPAGATION ARRANGEMENT
14 Claims, 29 Drawing Figs.

[52] U.S. Cl. .......... 340/174
[51] Int. Cl. .......... G11c 19/00, G11c 11/14
[50] Field of Search .......... 340/174

[56] References Cited
UNITED STATES PATENTS
3,470,547 9/1969 Bobeck .......... 340/174

*Primary Examiner*—Stanley M. Urynowicz, Jr.
*Attorneys*—R. J. Guenther and Kenneth B. Hamlin

ABSTRACT: Interactions between single wall domains permit logic operations to be realized in magnetic sheets in which such domains are moved. Magnetically soft overlay patterns not only define propagation channels for such domains in response to magnetic fields reorienting in the plane of the sheet but also define channel intersections where logic functions are carried out. Domains are idled or, alternatively, in direction at those intersections depending on the positions of preceding domains. A variety of counter circuits are described.

INVENTORS R. H. MORROW
A. J. PERNESKI
BY Herbert M. Shapiro
ATTORNEY

DOMAIN PROPAGATION ARRANGEMENT

FIELD OF THE INVENTION

This invention relates to data processing arrangements and, more particularly, to such arrangements including a sheet of magnetic material in which single wall domains are propagated.

BACKGROUND OF THE INVENTION

A single wall domain is a magnetic domain which is bounded by a single domain wall closing upon itself and having a geometry unconstrained by the boundary of the sheet in the plane in which the domain is moved. The domain conveniently assumes the shape of a circle and has a stable diameter determined by the material parameters. A bias field of a polarity to contract domains ensures movement of domains as stable entities. The Bell System Technical Journal, Volume XLVI, No. 8, Oct. 1967, at pages 1901 et seq., describes the propagation of single wall domains in a propagation medium such as a rare earth orthoferrite.

The movement of domains is accomplished normally by pulsing discrete propagation conductors for generating consecutive offset fields (viz., field gradients) of a polarity to attract domains. In this manner, a domain follows the consecutive attracting fields from input to output positions in the sheet. A three-phase propagation operation provides the directionality along a selected propagation path in a manner consistent with the teaching of the prior art.

The propagation conductor pattern assumes a geometry dictated by the material in which the domains are moved. A typical material is a rare earth orthoferrite. These materials have preferred directions of magnetization substantially normal to the plane of the sheet. If we adopt the convention that a sheet is saturated magnetically in a negative direction along an axis normal to the plane of the sheet, the magnetization of a single wall domain is in the other or positive direction along that axis. The domain then may be represented as an encircled plus sign where the circle represents the single domain wall. The propagation conductor pattern is conveniently in the form of consecutively offset closed loops to correspond to the circular geometry of the domain.

A variety of materials have been found with single wall domains far smaller than the smallest discrete conductors presently attainable. In order to move such small domains, magnetically soft overlays are juxtaposed with the surface of the sheet in which the domains are moved. In response to a reorienting in-plane field, magnetic pole patterns are produced by the overlay. The domains in the sheet follow the attracting poles from input to output positions in the absence of discrete conductors.

It is difficult to move domains selectively in such an arrangement however. Consequently, domain propagation circuitry in which logic operations are required are not easily realized in the absence of discrete propagation conductors.

An object of this invention is to provide a domain wall counting circuit in the absence of discrete propagation conductors.

BRIEF DESCRIPTION OF THE INVENTION

Single wall domains have the property of repelling one another like like-charged pith balls. This property is employed, in accordance with this invention, by providing an overlay of a geometry first to queue *n* consecutive domains in *n* consecutive idler positions in a first shift register channel and then to deflect an *n*+1th domain from the first channel into a parallel second channel. The advancing *n*+1th domain so deflected is employed to dislodge consecutive domains from the first channel into a network of channels conveniently to a domain annihilation area. The *n*+1th domain goes to an output position for detection or into a third channel for storage or, alternatively, for deflecting another set of idling domains there. All the domains are advanced in response to reorienting in-plane fields. An idler position is a position at which a single wall domain is recirculated between a plurality of slightly offset positions in response to the reorienting field.

In one embodiment, three idler positions are defined in a domain propagation channel by bar and T-shaped magnetically soft overlays. A domain is generated and advanced along the channel until the overlay geometry permits it to go no farther. The domain thereafter idles between four associated positions at the terminus of the channel. Consecutive domains are introduced to the channel illustratively at the rate of one every second rotation of the in-plane field. The second domain, however, is prevented from reaching the terminus of the channel by the repulsion force of the first domain. Three consecutive domains thus form a queue in the three consecutive idler positions. The fourth domain is prevented from entering the channel, because of repulsion forces, and is advanced in a parallel channel instead. Each consecutive position in the parallel channel is positioned such that the fourth domain dislodges consecutive idled domains as it advances. A detector at the end of the parallel channel detects one domain in four.

In another embodiment, the fourth domain is introduced into a second channel of three idler positions thus providing a count of one in 16.

In still other embodiments, channels having different numbers of idler positions provide counters with correspondingly different bases.

A feature of this invention is a propagation channel including overlays of magnetic material of a geometry to idle single wall domains in response to a reorienting in-plane field.

Another feature of this invention is a propagation channel including overlays of magnetic material of a geometry to idle consecutive single wall domains in consecutive idler positions in response to a reorienting in-plane field.

A further feature of this invention is a propagation channel including overlays of magnetic material of a geometry to define idler positions for consecutive single wall domains in consecutive idler positions and a domain propagation path for propagating a domain to dislodge idling domains from consecutive idler positions.

DETAILED DESCRIPTION

Figure 1:
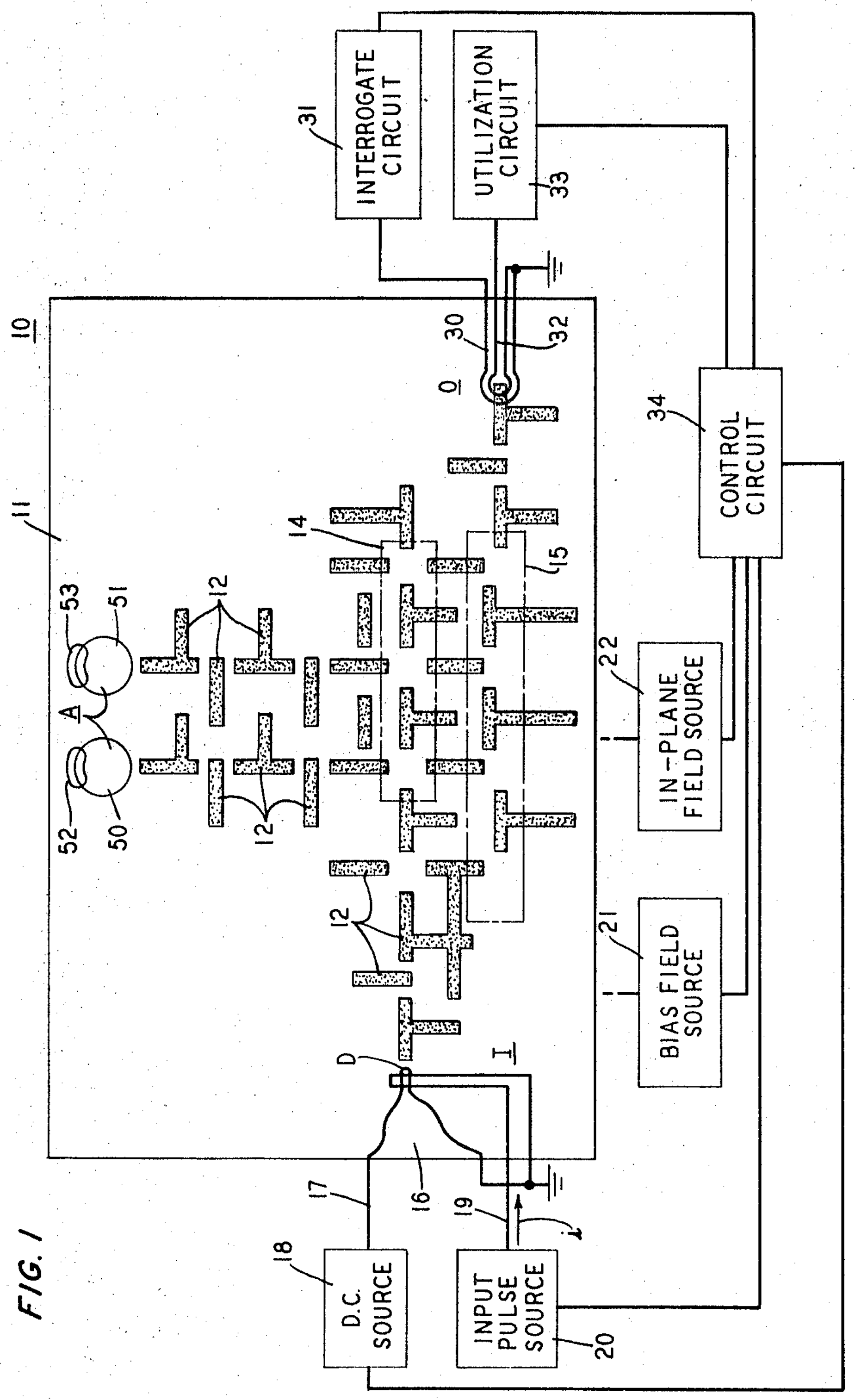
FIG. 1 is a schematic representation of a domain counter in accordance with this invention.

FIG. 1 shows a domain propagation arrangement 10 in accordance with this invention. The arrangement comprises a sheet 11 of a magnetic material in which single wall domains can be moved.

Bar and T-shaped overlays 12 define propagation channels and idler positions for single wall domains in sheet 11. The overlays are conveniently deposited on a glass substrate juxtaposed with sheet 11, or, alternatively, directly on a surface of sheet 11 by well-known vacuum-deposition and photoetching techniques. The overlays are conveniently of permalloy having a coercive force of one oersted or less where sheet 11 is, for example, terbium orthoferrite having a like coercive force.

The principal functional elements defined in sheet 11 by the overlay are first, a sequence of idler positions and a domain propagation channel parallel to the sequence of idler positions. The former is identified in FIG. 1 by a broken block 14; the latter by a broken block 15. In addition, an input position I, an output position O, and an annihilate position A are defined as shown in FIG. 1.

The organization of the overlay and the functions implemented thereby will be understood most simply by a description of the generation and the disposition of domains as an inplane field is reoriented in sheet 11. It is convenient, in this connection, to represent as plus signs the magnetic poles generated in the overlay by the in-plane field to attract domains. It is to be understood however, that for the assumed convention positive poles attract domains if the overlay is on the bottom surface of sheet 11 as viewed in FIG. 1 and negative if the overlay is on the top surface. To avoid confusion, a domain is represented only as a circle and plus signs shown therein represent the attracting pole concentrations.

The input position of FIG. 1 comprises a region 16 of positive magnetization for the convention assumed. Region 16 is separated from the remainder of sheet 11 by a domain wall coincident with a conductor 17. Conductor 17 is connected between a DC source 18 and ground and serves to maintain stable the geometry of region 16. A hairpin-shaped conductor 19 overlaps region 16 in a manner to separate a region D therefrom when a positive pulse is applied thereto as indicated by the arrow *i* in the FIG. Conductor 19 is connected between an input pulse source 20 and ground to this end. The region D so generated becomes a single wall domain, also designated D hereinafter, having a diameter determined, for any given sheet, by a bias field of a polarity to contract domains. The bias field is generated by any well-known means represented by block 21 of FIG. 1 and may comprise, for example, a coil encompassing sheet 11 and oriented in the plane of the sheet.

An alternative domain input responsive only to reorienting in-plane fields is described in copending application Ser. No. 756,210, filed Aug. 29, 1968 for A. J. Perneski.

Domains so generated are advanced by the changing pole patterns responsive to reorienting in-plane fields into the area encompassed by broken block 14 of FIG. 1. Specifically, an in-plane field in sheet 11 is reoriented by a source represented by block 22 of FIG. 1. The source may comprise for example two pairs of spaced apart coils each pair including coils parallel to one another and disposed orthogonally with respect to sheet 11 to provide the requisite fields as will be indicated hereinafter. The coils are pulsed, or sinusoidally driven, in pairs to ensure substantially uniform fields in sheet 11. When the coils are pulsed, for example, in sequence first with a pulse of one polarity, then of the opposite polarity, the appropriate fields are generated. The overlay configuration is designed to respond to fields rotating in the plane illustratively clockwise. The attracting poles are generated, in each instance along the overlays having long dimensions parallel to the field.

Operation in accordance with this invention depends on the formation by the overlay of various types of intersections between domain propagation channels where domains move in one manner when other domains are not present for interaction therewith and in a different manner when other domains are present. Block 14 of FIG. 1 encompasses three of one type of intersection. A domain entering one such an intersection passes therethrough unless its passage is blocked, for example, by the presence of a domain in the next adjacent intersection.

Figure 2:
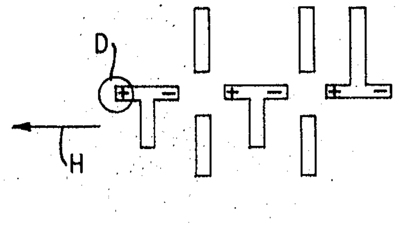
FIGS. 2—25 are schematic representations of portions of the arrangement of FIG. 1 showing magnetic conditions therein and the corresponding in-plane field in each instance.
Figure 3:
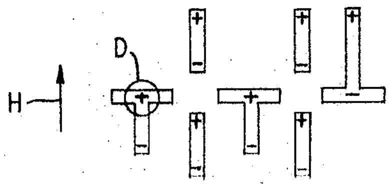
Figure 4:
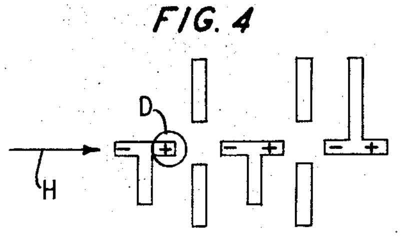
Figure 5:
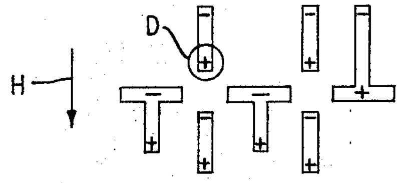

The alternative operations are illustrated in FIGS. 2 through 11. FIG. 2 shows a representative pair of intersections of FIG. 1. A domain advances from the left as viewed as the in-plane field H rotates clockwise. FIG. 2 illustrates the position of a domain D when the in-plane field is directed to the left as shown by the arrow designated H in that FIG. In FIG. 3, the arrow is shown directed upward. The pole configuration changes and the domain moves to the closest attracting (+) pole as shown. FIG. 4 shows the arrow directed to the right. The domain moves again to the right as viewed. In FIG. 5, the arrow is directed downward. Attracting poles accumulate at the bottom of each portion of the overlay as viewed. Once again the domain moves to the right.

Figure 6:
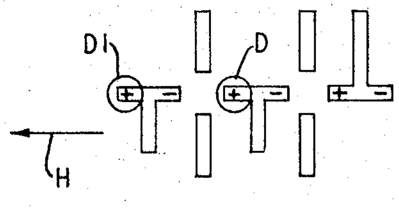
Figure 7:
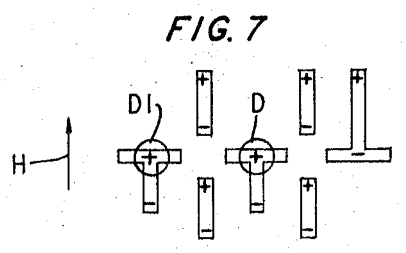
Figure 8:
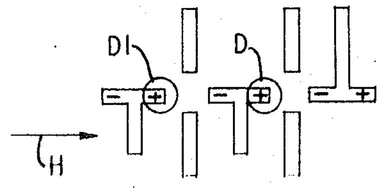
Figure 9:
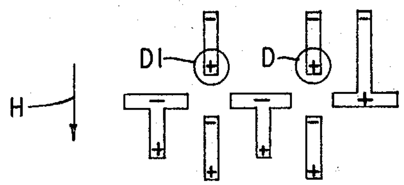

The sequence of in-plane fields shown in FIGS. 2 through 5 now repeats. Consider now that a second domain, D1, is introduced as shown in FIG. 6. The field is directed to the left as viewed and the pole configuration is as it was in FIG. 2. FIGS. 7, 8, and 9 show pole distributions identical to those shown in FIGS. 3, 4, and 5 as the field rotates upward, to the right, and downward, respectively. But in FIGS. 7, 8, and 9, the advance of both domains D and D1 is shown.

Figure 10:
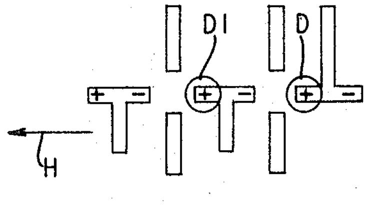
Figure 11:
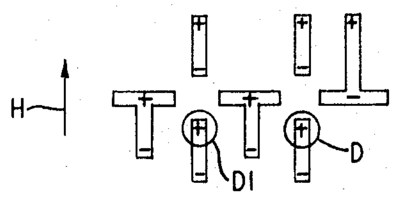

FIG. 10 shows the in-plane field again directed as shown in FIG. 2. When the field is next directed upward as shown in FIG. 11, domain D1 finds two close attracting pole concentrations, one to its right as viewed in FIGS. 10 and 11; the other downward and to its left. Normally, domains would move to the right under such conditions because they prefer to maintain flux closure through the associated overlay rather than move to another overlay. In this instance, the normal preference is overcome by the fact that domain D is constrained by the overlay geometry to move to a position which inhibits the movement of domain D1 to the right. The positions for both domains D and D1 are shown in FIG. 11.

When the field once again rotates to the right, the domains D and D1 are again in the positions shown in FIG. 8. For further rotations of the field, the domains idle as shown in FIGS. 8, 9, 10, and 11.

Block 14 of FIG. 1 comprises a propagation channel including a sequence of such idler intersections and consecutive domains are moved into those positions queueing up on another until the idler positions are filled. If the channel includes nine idler positions only, a 10th domain is prevented from entering the channel. That domain instead is deflected to a parallel channel and is used to dislodge domains from consecutive idler positions as it advances. In this manner, the idler positions are emptied and the contents advanced along perpendicular paths, to an annihilation area. The 10th domain, on the other hand, is either detected or used as a "carry" indication to be introduced to a next, a 10's, decade counter.

It is clear, then that the overlay is designed to provide various changes in normal domain movement as has been mentioned. One occurs when all the idler positions are filled and a next subsequent domain is deflected to a parallel channel. The other occurs when that deflected domain dislodges consecutive idled domains from the idler positions for annihilation. The overlay configurations for realizing these functions in response to rotating in-plane fields will now be discussed.

Figure 12:
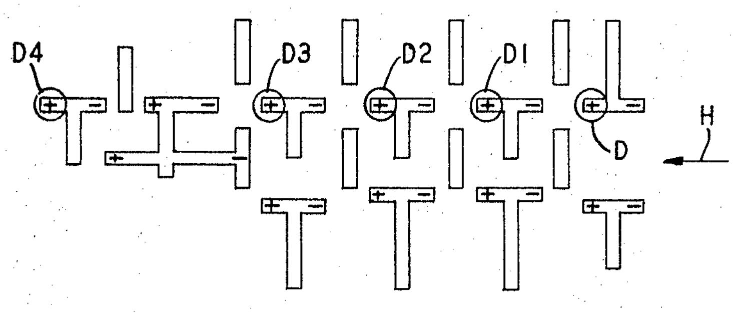

FIG. 12 shows the entire idler channel of FIG. 1. The channel is filled with domains D1, D2 and D3. Domain D, as will become clear, now permanently occupies the rightmost idler position as viewed in the FIG. Attention now focuses on domain D3.

Figure 13:
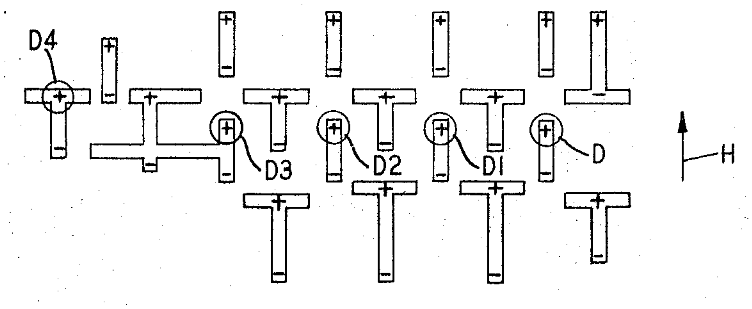
Figure 14:
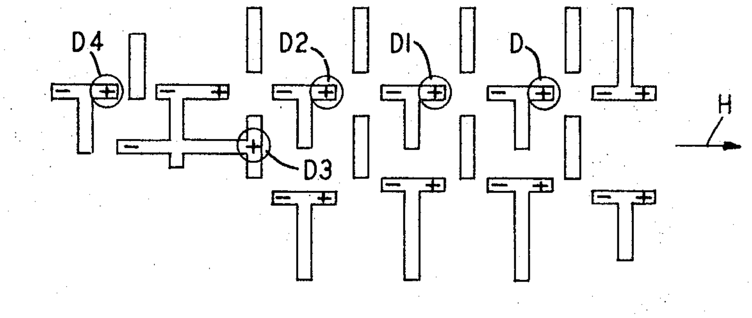

The field rotates upward as shown by the arrow H in FIG. 13. The domains, in response, move to the positions shown. FIG. 14 shows the field directed to the right. If FIGS. 13 and 14 are compared, it will be seen that domain D3 in FIG. 13 has two close attracting pole concentrations as shown in FIG. 14. But the pole strengths are different, the lower pole being far stronger than the one upward and to the left as viewed in FIG. 14 with respect to the position occupied by domain D3 in FIG. 13. The difference in strength is due to the overlay geometry which causes a greater pole separation for the lower (+ and −) associated poles than the separation between the poles to the left.

Figure 15:
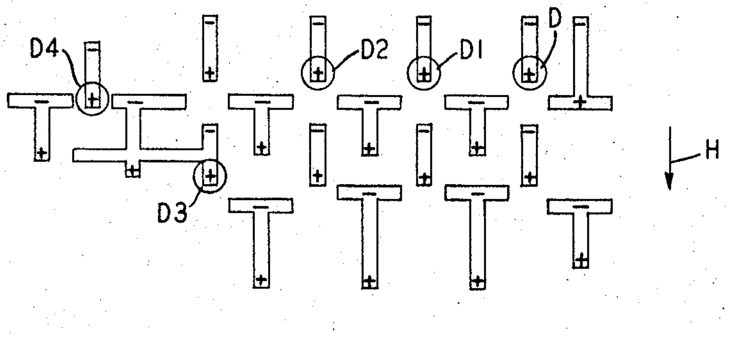

The in-plane field rotates further clockwise to a downward position as shown in FIG. 15. Domains D, D1 and D2 idle; domain D3 moves downward as viewed in the FIG. When the field next is directed to the left as shown in FIG. 16, domain D3 enters the parallel channel encompassed by broken block 15 of FIG. 1.

Figure 16:
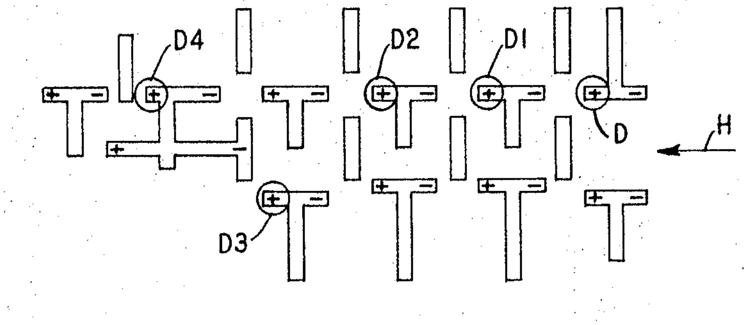
Figure 17:
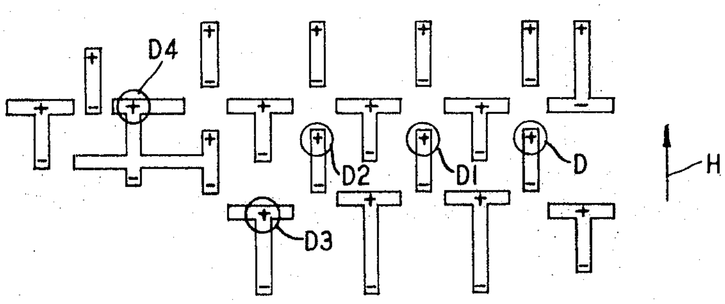
Figure 18:
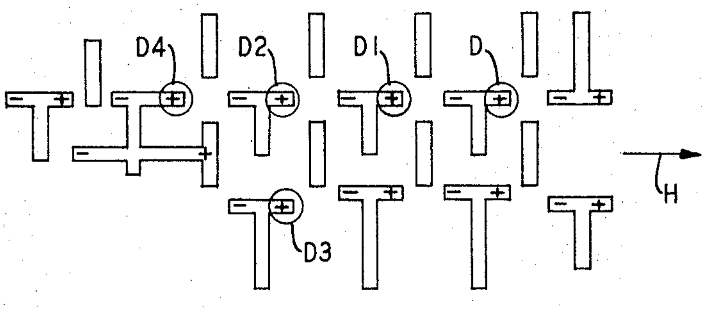
Figure 19:
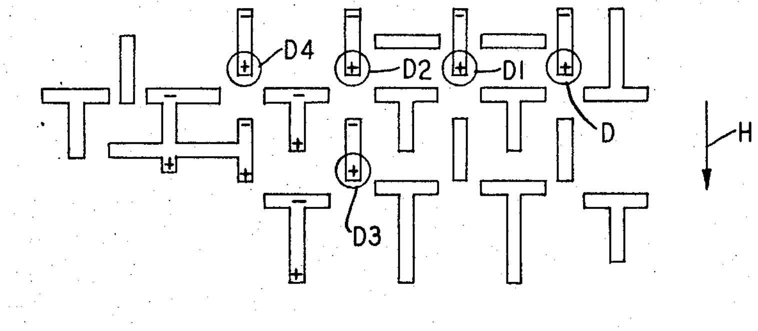
Figure 20:
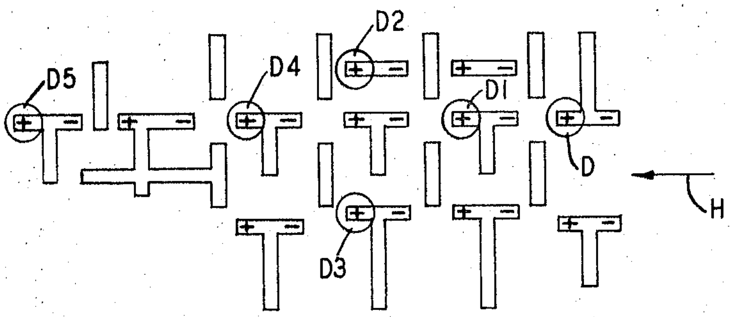

Domain D3 now functions to dislodge the domains D2, D1, and D in sequence as it moves to the right as viewed in FIG. 16. FIGS. 16 through 25 show the advance of domain D3 as well as the disposition of other domains in sheet 11 in response to further changes in the in-plane field orientations. In FIGS. 16 through 18, domain D3 moves to the right as does a next subsequent domain D4. The domains D, D1 and D2 idle in the above-described manner. FIG. 19 shows the in-plane field again directed downward as viewed. The presence of domain D3 in the position shown in FIG. 19 prevents domain D2 from taking its usual next position (see FIG. 16). Instead, domain D2 is dislodged from its idler position and attracted by poles on horizontal overlay bars shown for the first time (except for FIG. 1) in FIG. 19 when the field is next directed to the left as shown in FIG. 20.

Figure 21:
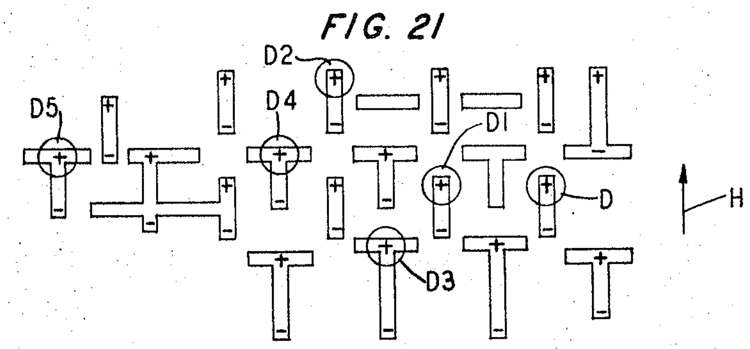
Figure 22:
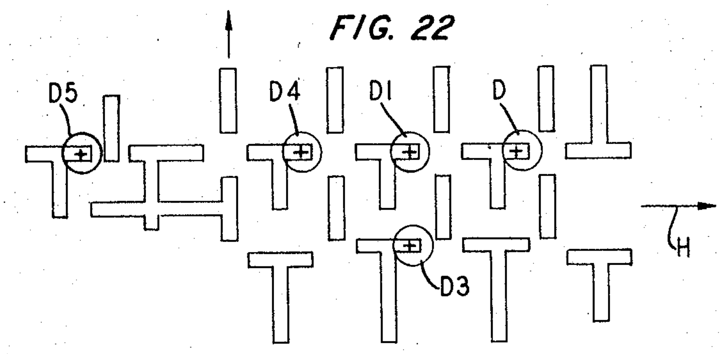

Domain D2 is now free of its idler position and moving upward as shown in FIG. 21 as the in-plane (H) field reorients to an upward direction. Meanwhile domain D4 is advanced into an idler position and new domain D5 is supplied as is clear from a comparison of FIGS. 19—22.

Figure 23:
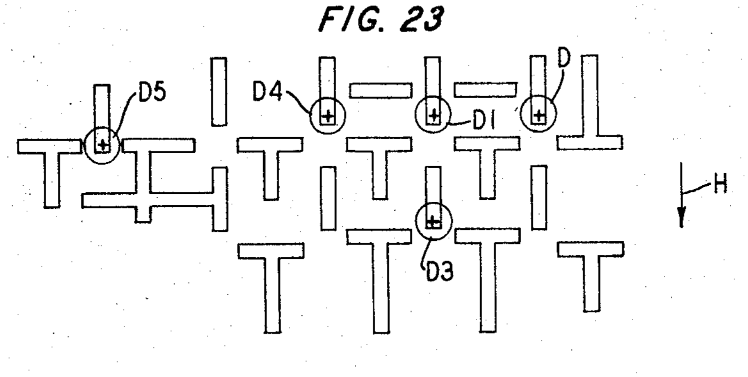
Figure 24:
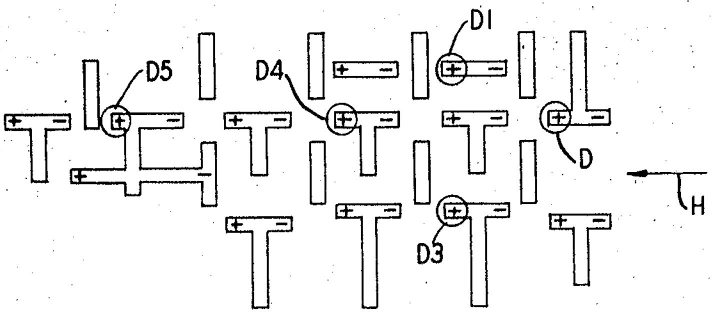

Domain D3 advances to dislodge next consecutive domain D1. FIG. 23 shows domain D3 just below domain D1. When the field reorients to the left as shown in FIG. 24, the position below and to the right of domain D1 (in FIG. 24 with respect to the position of domain D1 in FIG. 23) is not available for that domain because of the proximity of domain D3. Domain D1 thus can move only upward as did domain D2 previously as shown in FIG. 20. Domain D1 moves further upward as domain D3 moves further to the right as shown in FIG. 25 as the in-plane field is reoriented upward.

Domain D is illustratively not ever dislodged from its idler position because of the absence of an associated horizontal bar, as shown in FIG. 19, there. The overlay is of a geometry to trap a domain as a convenience to terminate the idler (or queueing) channel. In practice, the channel may be terminated in this manner or by other modified overlay configurations as discussed hereinafter.

Figure 25:
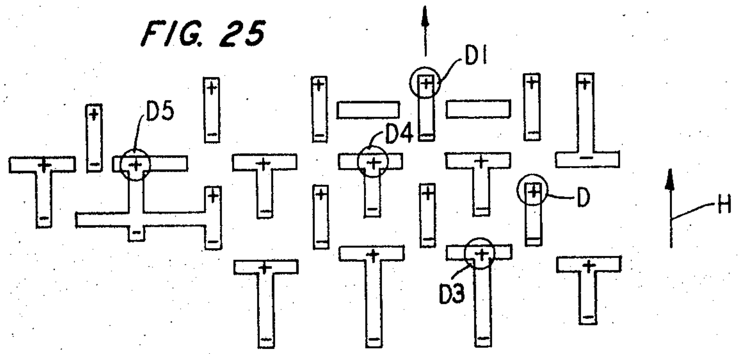

Domain D3 continues to the right as viewed in FIG. 1 for detection and the idler channel again refills as is clear from FIG. 25.

In each instance the first overflow domain advances in a parallel channel dislodging the domains from ($n$) consecutive idler positions. As will become clear, the dislodged domains are annihilated illustratively. The overflow ($n$+1th) domains may be detected to provide useful outputs at a one out of $n+1$ rate or to provide a carry indication for a next adjacent similar channel to which it is supplied as a regular input. First we will discuss an output for detecting such an overflow domain, then the annihilate implementation and a convention of symbols to represent more complicated arrangements for the overlay configuration to achieve relatively complex functions. It will be helpful in connection with the symbol convention if it is appreciated that an idler position accompanied by a dislodge configuration is the equivalent of a flip-flop and that a multiple channel arrangement functions as a magnetic abacus.

FIG. 1 shows an output implementation at the lower right as viewed. A conductor 30 couples the terminal position of the parallel channel encompassed by broken block 15 in FIG. 1. Conductor 30 is connected between an interrogate circuit 31 and ground. A conductor 32 also couples that terminal position and is connected between a utilization circuit 33 and ground. Interrogate circuit 31 pulses conductor 30 periodically with a pulse of a polarity to cause a collapse of a domain in the so coupled position. If a domain is collapsed, conductor 32 applies a pulse to utilization circuit 33. For any channel having $n$ idler positions plus an input and a dummy (permanently filled) position, an output can be provided for every $n+1$ input pulses; $n$ can be any number from one, providing a binary counter to, for example, nine providing a decade counter. The number of idler positions determines the base to which the counter counts.

Circuits 31 and 33 as well as sources 18 and 20 are connected to a control circuit 34 for synchronization and activation. Bias field source 21 and in-plane field source 22 are also connected to control circuit 34 for this purpose. The various sources and circuits may be any such elements capable of operating in accordance with this invention.

The domains dislodged from the idler positions move upward as viewed in FIG. 1 as the in-plane field rotates until they reach relatively large, illustratively, magnetically soft overlay discs 50 and 51. These discs have domains 52 and 53 permanently associated with them and act as sinks to domains moving upward along associated channels. The annihilate implementation is analogous to the input arrangement disclosed in the above-mentioned copending application.

Figure 27:
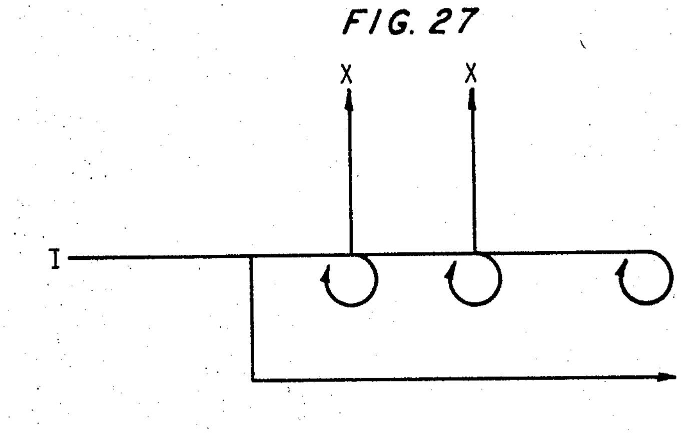
FIGS. 27, 28 and 29 are symbol diagrams of various embodiments in accordance with this invention.
Figure 26:
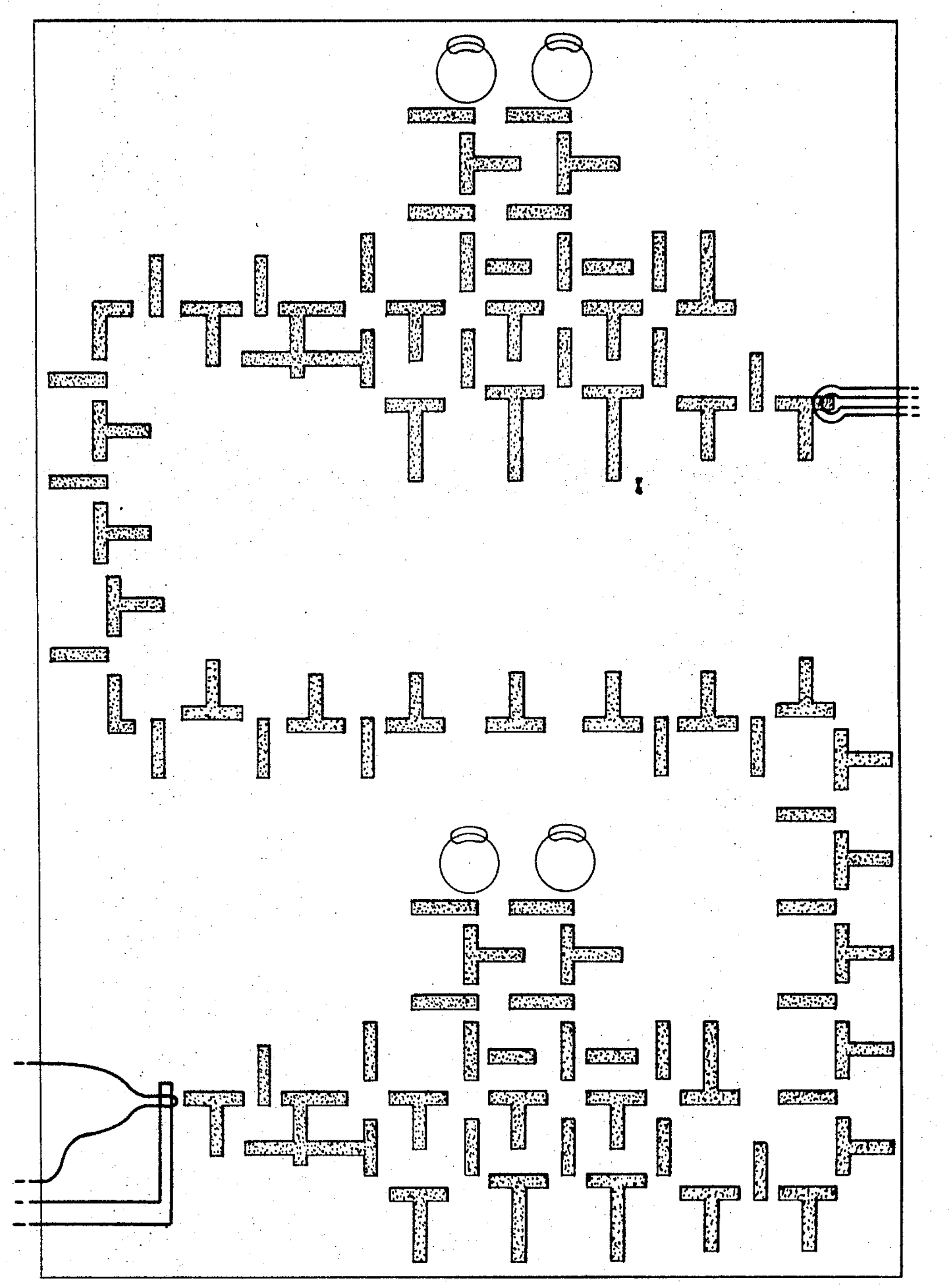
FIG. 26 is a schematic representation of an alternative arrangement in accordance with this invention.
Figure 28:
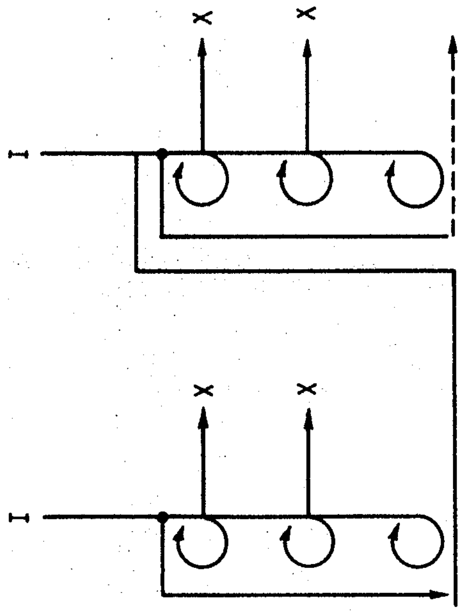

There are a variety of embodiments in accordance with this invention wherein the overflow domain is carried to a next adjacent idler (queueing) channel. FIG. 26 shows a two channel counter similar to that shown in FIG. 1. It is convenient to show these circuits in terms of symbols for a discussion of various circuit aspects in which the aforedescribed functional building blocks are utilized in combination. The idler positions accordingly may be represented by clockwise directed curved arrows. The parallel channel may be represented as a long arrow as can the channels to the annihilate positions. The annihilate positions may be represented as an X and each input position may be represented as I. FIG. 1 thus appears in symbol form as shown in FIG. 27. The multichannel arrangement of FIG. 26 appears, in symbol form essentially as shown in FIG. 28. A separate input may be provided for each counter when it is desired to add multidigit numbers.

Now that we have an understanding of the building blocks with which the basic interaction operations are realized in response to reorienting in-plane fields as well as the symbol convention for these blocks we can turn our attention to the circuits in which those basic building blocks are utilized to perform counting operations.

Figure 29:
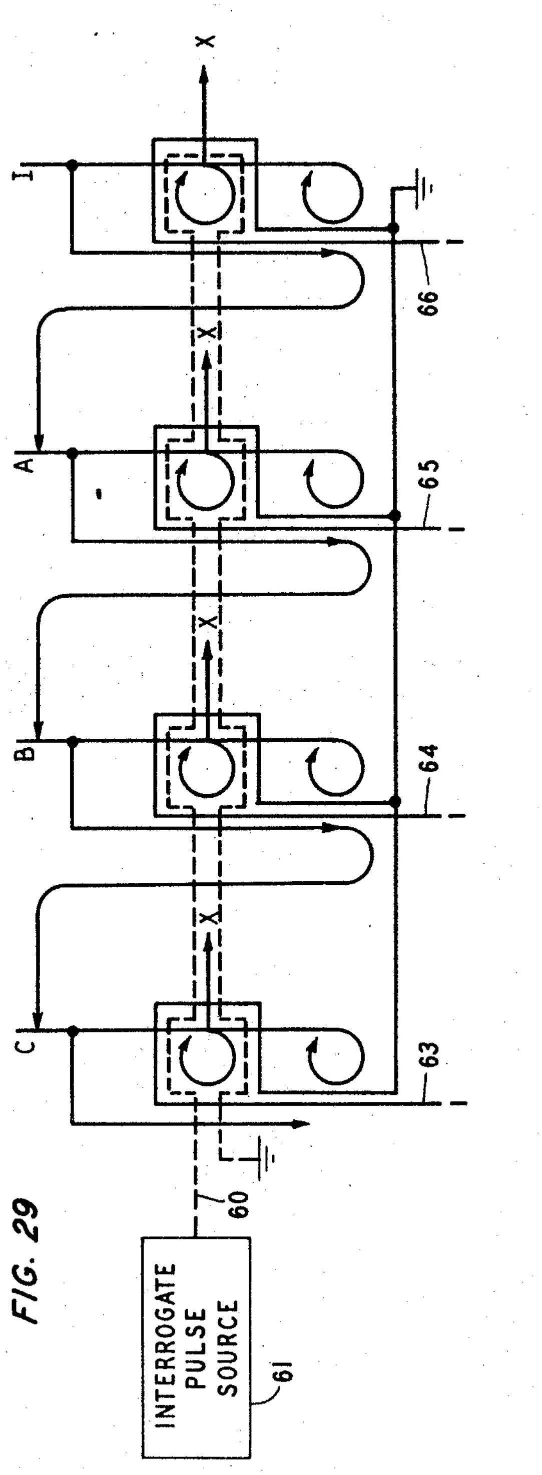

The most simple circuit is a binary counter circuit as shown in FIG. 29. We will assume that the lowest idler position in each channel, as viewed in the FIG., is occupied permanently. A domain is now introduced into the first channel at I for recirculation; a binary 1 is stored. A second domain introduced at I dislodges the first for annihilation and itself is advanced to the second register from the right as viewed. The second domain recirculates in the idler position in the second register; a binary 1 is now stored in the second register and a binary 0 is stored in the first. A third domain introduced at I recirculates in the idler position in the first channel. The binary code 1 1 is now stored. A fourth domain dislodges the third domain for annihilation and is itself advanced to the second channel. But the second domain is already recirculating in the second channel. The fourth domain dislodges the second domain for annihilation and itself advances to the unoccupied third channel from the right where it recirculates. The binary code now stored is 1 0 0. It is easy to see that consecutive domains provide the familiar binary code of the following table.

| Channel #4 | Channel #3 | Channel #2 | Channel #1 |
|---|---|---|---|
| | | | 1 |
| | | 1 | 0 |
| | | 1 | 1 |
| | 1 | 0 | 0 |
| | 1 | 0 | 1 |
| | 1 | 1 | 0 |
| | 1 | 1 | 1 |
| 1 | 0 | 0 | 0 |
| 1 | 0 | 0 | 1 |
| 1 | 0 | 1 | 0 |
| 1 | 0 | 1 | 1 |
| 1 | 1 | 0 | 0 |
| 1 | 1 | 0 | 1 |
| 1 | 1 | 1 | 0 |
| 1 | 1 | 1 | 1 |

Since a binary counter requires only one idler position, the overlay geometry adjacent the input may be simplified to respond properly to a domain input during each cycle.

Readout of a circuit of the type shown in FIG. 29 may be accomplished optically via the Faraday effect or electrically. An electrical readout is achieved by means of conductors 60 encompassing the idler positions as shown in FIG. 29. Conductor 60 is connected between an interrogate pulse source 61 and ground. Under the control of a control circuit similar to that of FIG. 1, source 61 pulses conductor 60 to contract or collapse domains in all the positions coupled. For each channel including idled domains, an associated output conductor 63, 64, 65, or 66 provides a pulse representing a binary 1 to a suitable detector not shown. No pulse is present on output conductors associated with idler positions unoccupied by domains.

A similar operation is achieved by the organization of FIG. 28. Each channel here, however, accepts two domains for idling before a (third) domain is deflected to a parallel channel. Each third domain thus is directed to a next adjacent channel clearing the channel from which it is deflected. A decade counter is realized similarly when each queueing channel includes nine idler positions. Every 10th domain clears the channel from which it is deflected and, in turn, is stored in the next higher order decade channel.

For realizing an adder operation, an input is provided at each queueing channel. Each digit is coded, in a straightforward manner, into a sequence of pulses each of which generates a sequence of domains for introduction into the corresponding queueing channels. An in-plane field can be rotated at about the microsecond rate or faster. Accordingly, all domains are stored in a fraction of a millisecond. A next consecutive number to be added to the first is introduced in identical fashion.

In those instances where channels become filled, the deflected domain represents a carry indication for introduction to the next higher order decade queueing channel. Between about 12 and 35 field rotations are utilized to advance a "carry" domain to the input position of the next channel depending on the overlay configuration. Of course, that next channel may be filled also, in which case the carry domain is shunted to the still next higher order queueing channel for storage. Since in the most extreme situation all channels may be filled, the carry operation may require 35*n* rotations of the in-plane field where *n* is the number of channels (decades represented). Next consecutive inputs are timed to allow the carry operation to be completed.

Readout of a plurality of multiidler (queueing) channels performing an add operation is conveniently similar to that shown for the binary counter of FIG. 29. A series interrogate circuit similar to conductor 60 of FIG. 29 is coupled to the correspondingly situated idler position in each queueing channel. An output conductor is coupled serially to the idler positions in each queueing channel. The output organization is quite similar to that of a conventional word-organized memory where the interrogate conductor (60) corresponds to a word line and the output conductors (63, 64, 65, and 66) correspond to digit lines.

The particular illustrative overlay geometries shown in FIGS. 1 and 26 are designed to respond properly to inputs supplied every other in-plane field rotation in order to allow time for requisite consecutive operations to occur before next subsequent domains appear. Alternative geometries permit an input during each rotation. One simple geometry which permits this faster inputing in bursts is first and second (viz., bifurcated) input channels into which domains are introduced alternatively depending on the presence or absence of a domain in the first. The second of the bifurcated channels includes twice the number of stages as are included in the first between the input position and the position at which the channels again interconnect. Such an arrangement is positioned at I in FIG. 1.

Also, it was stated hereinbefore that a dummy idler is utilized at the terminus of each queueing channel. Such a dummy is convenient for ensuring a queueing operation. A similar result is obtained by an overlay geometry which terminates the channel by failing to provide attracting poles to move a domain any further. In the absence of such attracting poles, a domain is constrained to idle in the terminal idling position until dislodged. The bottom right T-shaped overlay in FIG. 1 is in a relatively displaced position and of a relatively small geometry to ensure continued idling of the domain.

Circuits of the type indicated in FIGS. 1, 26 or 29 may be provided on sheets of material of minute proportions. For example, overlay bars, and T-shaped elements on the order of 1 by 4 mils, are suitable for moving domains having diameters of the order of 1 mil and permit a circuit such as that of FIG. 29 to be defined on a piece of say samarium-terbium orthoferrite 150 by 50 mils. Optical readout techniques permit the same circuits to be defined on sheets of say strontium aluminum ferrite 15 by 5 mils where domains of about 2 microns are moved.

It is of interest to observe that domains dislodged from idler positions need not be annihilated. Instead, detectors may be substituted for the annihilating mechanism. With this substitution, a queueing channel of the binary counter of FIG. 29 becomes a logical AND circuit. Other logical functions can be implemented similarly.

What has been described is considered only illustrative of the principles of this invention. Accordingly, other and varied modifications therein may be devised by those skilled in the art within the spirit and scope of this invention.

We claim:

1. A domain propagation device comprising a sheet of magnetic material in which single wall domains can be moved, an overlay of magnetically soft material for providing magnetic poles to attract domains in the presence of a magnetic field in the plane of said sheet, said overlay being of a configuration to define a first domain propagation channel including a first position in which a first domain is idled in response to reorientations in said in-plane field and to define a second channel intersecting said first channel such that a second domain at said intersection is defected into said second channel when said first position is occupied by said first domain, and means for providing single wall domains for propagation in said first channel.

2. A device in accordance with claim 1 wherein said second channel is of a geometry and in a location such that a second domain being advanced therein responsive to a reorienting in-plane field dislodges said first domain from said first position.

3. A device in accordance with claim 2 also including means for annihilating first domains so dislodged.

4. A device in accordance with claim 3 wherein said last-mentioned means comprises a magnetic overlay including a domain moving about the periphery thereof responsive to a reorienting in-plane field.

5. A domain propagation device comprising a sheet of magnetic material in which single wall domains can be moved, an overlay of magnetically soft material for providing magnetic poles to attract domains in response to a reorienting in-plane field, said overlay being of a configuration to define a first domain propagation channel including *n* consecutive idler positions each adapted to idle a single wall domain, said idler positions being spaced sufficiently close together such that a domain occupying one of said *n* idler positions constrains the next consecutive domain from advancing past the next consecutive domain from idler position, means for introducing single wall domains at an input position in said first channel, and means for providing reorienting in-plane fields.

6. A device in accordance with claim 5 wherein said overlay defines a second channel and an intersection between said first and second channels, said intersection being of a configuration such that an *n*th domain occupying the *n*th of said *n* consecutive idler positions deflects an *n*+1th domain into said second channel.

7. A device in accordance with claim 6 wherein said second channel is of a configuration to dislodge consecutive domains from consecutive idler positions as said *n*+1th domain is advanced.

8. A device in accordance with claim 7 also including means for annihilating each domain so dislodged.

9. A device in accordance with claim 8 wherein said last-mentioned means comprises a propagation channel intersecting each of said idler positions and an overlay including a domain moving thereabout responsive to a reorienting in-plane field terminating each of said last-mentioned propagation channels.

10. A combination comprising a plurality of devices in accordance with claim 9 wherein the second channel of each of said devices intersects the first channel of a next consecutive device such that said $n+1$th domain in each of said devices is carried to the input position of the next consecutive first channel.

11. A domain propagation device including a sheet of magnetic material in which single wall domains can be moved, a magnetic overlay for providing responsive to reorienting in-plane fields moving magnetic poles for attracting single wall domains, said overlay being of a geometry to define first and second propagation channels for single wall domains and an intersection therebetween, said first channel including a position at which single wall domains are idled in response to reorienting in-plane fields, means for introducing single wall domains to said first channel, said overlay at said intersection being of a configuration such that a domain occupying said idler position deflects a next subsequent domain into said second channel, said first and second channels being disposed such that said second domain dislodges said first domain, means for annihilating domains so dislodged, and means for providing a reorienting in-plane field.

12. A combination comprising a plurality of devices in accordance with claim 11 wherein each of said second channels also intersects the first channel of a next consecutive device such that said second domain in each of said devices is carried to the first channel of the next consecutive device, and means for introducing single wall domains into a first of said plurality of devices.

13. A combination in accordance with claim 12 wherein said means for providing single wall domains is responsive to coded input signals representing decimal digits for providing corresponding numbers of domains at corresponding input positions.

14. A combination comprising a sheet of magnetic material in which single wall domains can be moved, magnetically soft overlay patterns for defining intersecting channels for single wall domains therein responsive to changing in-plane fields, means for providing in-plane fields in said sheet, means for providing idler positions for single wall domains at intersections between said channels responsive to said changing in-plane fields, and means for providing single wall domains in a manner to deflect single wall domains so idled.